United States Patent Office 3,436,371
Patented Apr. 1, 1969

3,436,371
PEROXIDIC CURING OF POLYMERS
John Ware, 72 Myrtle Ave., Westport, Conn. 06880
No Drawing. Filed Oct. 21, 1965, Ser. No. 500,301
Int. Cl. C08f 45/72; C08g 51/74
U.S. Cl. 260—46.5         2 Claims

ABSTRACT OF THE DISCLOSURE

The curing of a polymer containing a peroxide curing agent therefor dispersed therein is improved by the presence of a compound which contains a benzylic carbon which is reactive with the peroxide to produce a free benzylic radical at the site of the benzylic carbon when said compound is present in an amount that is consistent with substantial curing of the polymer induced by the peroxide cross-linking agent and that is effective to substantially retard the rate of curing of the polymer at a temperature at which substantial curing would occur in the absence of the compound.

---

This invention relates to peroxide cross-linking agents and to the use thereof in chemical cross-linking polymeric materials. It relates more especially to means whereby the chemical cross-linking of polymeric substances by the use of peroxide curing agents may be controlled and improved.

It has been recognized heretofore that polymeric substances such as polyethylene can be chemically cross-linked by means of various organic peroxide cross-linking agents such as benzoyl peroxide, tertiary butyl perbenzoate, dialphacumyl peroxide, etc. Curing of polymeric substances also has been effected using inorganic peroxide cross-linking agents. Curing effected by such chemical cross-linking has been resorted to for the purpose of improving the physical properties of polymeric substances. When chemically cross-linked, improved physical properties are afforded such as improved form stability and toughness at both ordinary and elevated temperatures and increased resistance to certain solvents. The cross-linking is effected by blending the peroxide cross-linking agent with the polymer and then subjecting the blend to curing to a temperature at which cross-linking occurs at a reasonably rapid rate. The cured polymer has many commercial uses such as wire insulation and the fabrication of parts wherein form stability is a desirable attribute.

The necessity for blending the organic peroxide curing agent with the polymeric substance to be cross-linked without premature cross-linking imposes a severe limitation on the commercial utilization of chemical cross-linking by means of peroxide cross-linking agents. This is especially the case when, as in most commercial applications, the curing is effected at an elevated temperature which must be attained in order that curing may take place at a reasonably rapid rate. Especially under such circumstances difficulties have been encountered due to the small tolerance between the minimum temperature at which effective blending may be had and the temperature at which curing begins to take place at a rate which does not afford enough time for effective blending and forming. The severity of this limitation is evident from the fact that up to the present time the use of organic peroxides to chemically cross-link polyethylene has been limited to polyethylene which is known in the art as low density polyethylene, namely, produced under conditions of high temperature and pressure. Polyethylenes of the high density type produced under conditions of relatively low temperatures and pressure have not been successfully cross-linked commercially due to its crystallinity which requires working temperatures at which peroxide cross-linking agents decompose during blending with resultant premature curing. Moreover, even in the case of low density polyethylene, commercial utilization of peroxide cross-linking agents is severely restricted due to the fact that the organic peroxides which are used tend to gradually decompose at temperatures somewhat below normal curing temperatures, with the result that when the blend is heated to a temperature sufficiently high to permit shaping cross-linking occurs at a rate which requires that shaping be prompt and which prevents the shaping of many types of articles due to the fact that the blend becomes cross-linked excessively before the desired shape is achieved. Moreover, such heating also induces loss of available peroxide and impairment of ultimate cure. Heat resulting from mechanical working in an operation such as extrusion or injection molding aggravates this difficulty and if more than a very limited amount of plastic flow is attempted either the temperature is too low to permit it or premature cross-linking starts to take place. Since the tendency to cure prematurely becomes increased with increased amounts of peroxide, the amount of peroxide which may be employed is limited, even though for some purposes a larger amount of peroxide would be desirable.

It is because of difficulties and limitations of the character aforesaid that curing by chemical cross-linking using organic peroxide curing agents in commercial practice has been confined principally to low density polyethylene, ethylene-propylene rubber and silicone rubber. The softening temperatures of these polymeric materials are sufficiently low to permit the incorporation of limited amounts of an organic peroxide curing agent and then permit a limited amount of forming.

It is an object of this invention to greatly extend the field of applicability of peroxides in chemically cross-linking organic polymeric substances. This includes extending such chemical cross-linking to polymers as to which chemical cross-linking heretofore has not been regarded as feasible. It also includes enlarging the kinds of forming operations which are feasible when using those polymeric substances that heretofore have been cured by chemical cross-linking.

I have discovered that aromatic organic compounds, which will be referred to sometimes hereinafter merely as the "modifier," have the peculiar property of modifying the behavior of peroxide curing agents particularly in relation to the phenomena which occur in effecting the chemical cross-linking of polymers. These compounds preferably are aromatic compounds which contain a benzylic hydrogen. The benzylic hydrogen of said compounds is reactive with free peroxyl radicals furnished by the peroxide to form a modified aromatic compound containing a free benzylic radical. Other organic compounds which are reactive with a free peroxyl radical furnished by the peroxide to form a modification thereof containing a free benzylic radical also are operable according to this invention whether the free benzylic radical results from cleavage at a benzylic carbon or at some carbon atom in steric isomeric resonance with respect to the benzylic carbon atom whereby the reaction-modifying effectiveness of a free benzylic radical is afforded. Free peroxyl radicals are supplied to some extent for effecting such reactivity even at relatively low temperatures. However, the modifiers used according to this invention are of especial utility in retarding curing when the polymer containing the peroxide curing agent is at a temperature at which substantial curing promoted by the presence of free peroxyl radicals normally would occur. However, when a modifier is employed in accordance with this invention the resulting presence of free benzylic radicals has the effect of retarding cross-linking of the polymer at a temperature at which substantial curing would otherwise take place while permitting the curing to occur without substantial retarding effect, or with much less retarding effect, when further energy in the form of heat is introduced into the system. Moreover, when the system is one that cures at a low temperature, e.g., room temperature, the pot life can be very substantially extended by the presence of the modifier.

The peculiar property of the modifier that is used in accordance with this invention of elevating the temperature at which curing in a commercially effective manner takes place is of great commercial significance in that it overcomes problems which have had a seriously hampering effect and which, despite their seriousness, the art up to now has been unable to solve in a commercially feasible manner.

The benefits of this invention are important in the case of those polymers which heretofore have been cross-linked by organic peroxide curing agents, for when the blending of the polymer and the peroxide is effected in the presence of the modifier, the blending can be accomplished without the very careful control of the mixing conditions that heretofore have been regarded as essential in order to prevent the occurrence of premature cross-linking. Moreover, and still more important, is the capacity of the blend containing the modifier to be subjected to molding and shaping under conditions which heretofore have been regarded as unfeasible due to the occurrence of premature cross-linking. However, upon thereafter heating the molded or otherwise shaped blend to a curing temperature which may be higher than the curing temperature ordinarily employed for the organic peroxide in question but which at the same time is low enough to be a safe temperature as regards adverse effects on the polymer, rapid and effective curing may be effected.

The benefits of this invention also are important in that they enlarge the field of polymers which may be chemically cross-linked using an organic peroxide curing agent. For example, it is highly desirable commercially to be able to extend chemical cross-linking by means of organic peroxide curing agents to high density polyethylene, namely, polyethylene, the density of which is about .945 or higher as well as low density polyethylene since high density polyethylenes are better for many purposes. By employing the modifier in accordance with this invention, it now has been made practical to chemically cross-link high density polyethylene. Previously the higher softening point of the high density polyethylene had resulted in excessive difficulties under most processing conditions due to premature reactivity with the peroxide cross-linking agent. By contrast, when the modifier is present in accordance with this invention a peroxide curing agent may be readily blended with high density polyethylene without prejudicial premature cross-linking reaction, and after blending and shaping have been accomplished curing by chemical cross-linking may be effected in a rapid and practical manner merely by heating the molded shape to the temperature at which such curing takes place.

This invention can be practiced in different ways. For example, the modifier may be added to a previously prepared blend of a polymer and an organic peroxide curing agent. Thus the modifier may be added to a low density polyethylene to which a small amount of a peroxide curing agent such as dicumyl peroxide already has been added. This invention also may be practiced by initially producing a blend of the organic peroxide curing agent and the modifier. Organic peroxides of the kind used for cross-linking have to be carefully handled lest initiation of its decomposition be induced, for once substantially induced the exothermic nature of the decomposition may result in such rise in temperatures as to greatly accelerate the decomposition reaction so as to even attain explosive violence. The presence of the modifier in blended relation with the peroxide tends to inhibit such an occurrence and is desirable in itself from the standpoint of the handling, shipping and using of organic peroxide cross-linking agents. Moreover, the presence of the modifier in pre-blended relation with the peroxide is of great advantage in that it greatly reduces the amount of care that has to be taken in blending a polymer such as a low density polyethylene with an organic peroxide cross-linking agent. It also enables such a peroxide cross-linking agent to be blended with a polymer such as high density polyethylene having such a high softening point as not to permit blending in the absence of the modifier.

EXAMPLE 1

In order to afford a better understanding of this invention, it will be described in connection with a concrete example which provides a demonstration of the effect of the modifier on the curing temperature of polyethylene. The polyethylene that was used is that contained in a curable composition which is available commercially under the trade name Polycure 502 and which has the approximate composition:

| Low density polyethylene: | Parts |
|---|---|
| Melt index, 2.0; spec. gravity, 0.918 | 100.0 |
| Dicumyl peroxide | 2.0 |
| Carbon black | 2.5 |
| Anti-oxidant | 0.5 |

The curing of the foregoing composition was tested both without and with different quantities of the modifier, and at different temperatures. The modifier that was used in each instance is a condensation product of dimethyl naphthalene produced by condensation reaction with formaldehyde with formation of methylene linkages as disclosed in Patent No. 2,660,572. It contains a plurality of benzylic hydrogens, namely, hydrogen atoms attached to a benzylic carbon, which carbon atom in turn is a is a carbon atom attached to a benzene ring.

Curing of the polyethylene as the result of cross-linking induced by the dicumyl peroxide results in an increase in consistency. The consistency was measured at given temperatures using an instrument sold under the trade name Plasticorder by C. W. Bradender Instruments, Inc. When using this instrument, a batch of material is brought to a predetermined temperature and mechanical working blades are caused to rotate in the batch at a constant rate by a motor whose field is mounted on bearings and is provided with a weight and a pointer so that resistance to the rotation is reflected by the position of the pointer. The position of the pointer is recorded on a chart that is moved at a constant speed so that the resistance to the mechanical action resulting in changes in consistency at progressively different moments is directly recorded on an arbitrary scale. The higher the scale value, the greater the consistency. On each run there is an initial high consistency value before the materials placed in the apparatus are reduced to homogeneous consistency at the jacket temperature of the testing device. The initial high consistency is followed by reduction to a relatively low consistency value which is that of the added materials after blending has been accomplished but prior to any substantial curing of the composition. When curing resulting from chemical cross-linking occurs, the consistency increases. The following runs were made:

Runs 1 & 2 of Example 1

The polyethylene composition above described containing dicumyl peroxide was tested at 149° C. Each batch was 46 gms. and the blades were rotated at 60 r.p.m. In each of these two runs the consistency rose from a minimum value of about 180 to a value of about 600 over a period of about 15 to 18 minutes.

Run 3 of Example 1

This run was identical to Runs 1 and 2 except that there was added 2% by weight of the aforesaid modifier. According to this run at 149° C. in the presence of 2% of the modifier, the consistency value rose from about 180 to only about 330 even when the run was continued for about 22 minutes, thus showing that at this temperature, namely, 149° C., the modifier had been effective in preventing substantial cross-linking of the polyethylene.

Run 4 of Example 1

Run 3 was repeated except that the modifier was 1% of the composition. In this case, the consistency value gradually rose from about 180 to about 450 over a period of 22 minutes. At 1% of modifier there was a very substantial inhibition of cross-linking, but not to the extent shown in Run 3.

Run 5 of Example 1

This run was carried out under the conditions of Runs 1 and 2 in the absence of any modifier, but at a higher temperature, namely, 201° C. At this higher temperature the consistency value rose to about 600 in about 3 minutes, the curing being faster at the higher temperature.

Run 6 of Example 1

Run 5 at 201° C. was repeated except that 2% of the modifier was added. In this case, the consistency value rose to about 560 in about 3.5 minutes, thus showing that at the higher temperature the vulcanization was nearly as complete and nearly as rapid as it was in Run 5 where no modifier was present.

Run 7 of Example 1

Run 6 was repeated but with the content of modifier increased to 4%. When using this larger content of modifier, there was a substantial diminution of vulcanization since the consistency value only rose to about 380, although it attained this value in about 4 minutes.

Run 8 of Example 1

When Run 6 was again repeated using only 1% of the modifier, the consistency value rose to about 600 in about 4 minutes.

Run 9 of Example 1

The composition was tested at 175° C. in the absence of any of the modifier, and the consistency value rose to about 635 in about 6 minutes.

Run 10 of Example 1

Run 9 was repeated except that 2% of the modifier was included and at this temperature the consistency value rose to about 450 in about 7 minutes.

The temperature at which the dicumyl peroxide that was used in performing the runs of Example 1 begins to have substantial activity as a cross-linking agent is known to be about 120° C., this being a function of the half life of the dicumyl peroxide which, like other peroxide curing agents, decreases rapidly as the temperature increases. Thus the half life of dicumyl peroxide in solution at about 120° C. is about 5.5 hours. At about 140° C., which is the lowest temperature recommended for its use in curing, the half life is about 36 minutes. At about 200° C., which is the highest temperature recommended for its use in curing, the half is given as about 3 seconds.

When using a peroxide cross-linking agent it is essential, therefore, that any polymer with which it is blended be capable of being processed and formed at a temperature as far as possible below the temperature at which substantial cross-linking begins to occur to an excessive degree, but such temperature is, of course, limited in that it cannot go to a temperature so low that the polymer no longer will have adequate workability for the mattert at hand. In curing the polyethylene illustrated in Example 1, it is important to blend the dicumyl peroxide with polyethylene at a temperature as much as possible below 120° C., but since the softening point of the polyethylene used is about 111° C., there is only a very narrow temperature zone within which processing and forming may take place, and due to the necessity for keeping the temperature during processing as low as possible the viscosity of the heat-plasticized polyethylene is such as to permit, according to prior practice, only a limited rate of processing. It is shown by the runs of Example 1 that the addition of 2% of the modifier now makes it possible to process the polyethylene at temperatures of the order of 149° C., namely, at a temperature that is well above that which would be the maximum processing temperature in the absence of the modifier. A marked increase is thereby afforded in the rate of processing with safety with resultant increase in the daily output of a given system. These advantages are gained without a material sacrifice in the rate of curing, for when the composition is heated to a somewhat higher temperature the curing is effected at nearly the same rate as the rate of curing at that temperature would have been in the absence of the modifier. Moreover, if desired, increased amounts of peroxide cross-linking agent may be employed as compared with prior practice.

EXAMPLE 2

In the processing of silicone rubber similar problems are encountered due to the low temperature which has to be maintained in order to prevent premature reactivity with the peroxide curing agent. Thus it is very difficult to make a silicone rubber flow into intricate molds when the temperature is maintained sufficiently low to prevent excessive premature curing. However, by the use of only a small amount of modifier according to this invention such difficulties have been successfully overcome as shown by the following data.

Using the testing apparatus and technique (80-gm. batch used) for measuring relative consistency values, a composition was tested composed of 55% of silicone rubber, 3.8% of trichlorobenzoyl peroxide and substantially 40% of fine siliceous filler. The silicone rubber content of the composition consisted essentially of dimethyl siloxane containing attached vinyl groups. Such silicone rubber compounded with stabilizing additive is an available commercial product that is sold under the trade name Silastic 433.

Run 1 of Example 2

Using the aforesaid composition with no modifier added and at a temperature of 80° C., the consistency value rose from about 320 to 1000 by the end of 10 minutes.

Run 2 of Example 2

Run 1 was repeated except in the presence of 2 gms. of the modifier used in Example 1. There was no evidence of curing.

Run 3 of Example 2

The discharge from Run 2 was heated to substantially 192° C. At this higher temperature there still was no evidence of substantial curing, showing that in the amount present in relation to the peroxide the modifier remained effective to prevent substantial cross-linking. Additional peroxide, namely, 3 gms. of dicumyl peroxide, were added and its addition was followed quickly by a large rise in the consistency value to over 1000, thereby indicating that when the ratio of peroxide to the modifier was increased so as to exceed that at which the modifier is effective to prevent curing at a given temperature the curing, once initiated, proceeds rapidly and to an extent comparable to that which occurs in the absence of the modifier.

Run 4 of Example 2

Run 2 was repeated except that the amount of added modifier was reduced to 1 gm. There was no evidence of curing at 80° C. 3 gms. of dicumyl peroxide was added to the composition and again there was no evidence of curing.

Run 5 of Example 2

The discharge of Run 4 was then heated to 135° C. and at this higher temperature the retarding effect of the modifier was overcome and curing was effected. Runs 4 and 5 of Example 2 thus demonstrate that in the case of silicone rubber the presence of only a small amount of modifier is effective to inhibit curing by chemical cross-linking at temperatures at which such curing normally occurs, but that upon heating the composition to a somewhat higher temperature the retarding effect of the modifier is broken down and curing occurs freely.

Run 6 of Example 2

Run 2 of this example was repeated except that the quantity of added modifier was reduced to 0.125 gm., this being only 4% of the peroxide cross-linking composition contained in the compound. In this run there was substantial retarding of curing notwithstanding the very small amount of modifier that is present.

As compared with the data of Example 1, the data of Example 2 shows that the quantity of modifier that is required to be used in accordance with this invention in relation to the peroxide will vary depending on the system in which the modifier is used. The small amount of curing agent that is required in the case of silicone rubber is believed to be due to the fact that the number of cross-linking sites is much fewer in the case of silicone rubber as compared with polyethylene.

EXAMPLE 3

This example illustrates that high density polyethylene may be cured by chemical cross-linking produced by an organic peroxide curing agent without excessive premature curing, provided a modifier is present in accordance with this invention.

The testing equipment and techniques of the preceding examples were employed using a 44-gm. batch. The high density polyethylene which was used had a melt index of 0.2, crystalline melt point of 130° C., and specific gravity of substantially 0.945.

Run 1 of Example 3

High density polyethylene by itself was first subjected to tests to determine its consistency at 135° C., this temperature being slightly above the melting of the polyethylene. The value as thus determined was about 210 on the chart.

Run 2 of Example 3

Run 1 was repeated except that there was added to the high density polyethylene in the testing at 135° C. 0.88 gm. (2%) of dicumyl peroxide. As soon as the peroxide was added curing began to take place and the consistency value rose from about 360 to over 1000 in less than 5 minutes. Since 135° C. is only slightly above the melting point of the high density polyethylene, this run illustrates the impracticality of attempting, in the absence of a modifier according to this invention, to employ with a high density polyethylene a peroxide cross-linking agent such as dicumyl peroxide.

Run 3 of Example 3

Run 2 was repeated except that 1.76 grams (4%) of the modifier used in Examples 1 and 2 was added with the dicumyl peroxide. The consistency value only rose from 320 to about 440 over a period of about 19 minutes, thereby showing that the curing reaction was almost completely stopped.

Run 4 of Example 3

Run 3 was repeated with the amount of modifier decreased to 1.32 gms. (3%). In this instance the consistency value rose from about 360 to about 665 over a period of about 15 minutes, thereby showing that in the presence of 3% of the modifier the curing reaction was slowed down substantially.

Run 5 of Example 3

Run 2 was repeated except that the dicumyl peroxide was added when the batch in the testing chamber was at 204° C. At this higher temperature the curing reaction was almost instantaneous.

Run 6 of Example 3

Run 3 was repeated at 204° C. and substantial reaction occurred as evidenced by the fact that the consistency value rose from about 300 to about 500 in about 2 minutes notwithstanding the presence of 4% of the modifier. The premixing of dicumyl peroxide with the modifier prior to incorporation in the hot polyethylene enabled the mixture to be incorporated and mixed into the polyethylene.

Run 7 of Example 3

Run 4 was repeated at 204° C. In the presence of 3% of the modifier the consistency value rose from about 300 to a peak value of about 760 in 2 minutes, this being significantly higher than in Run 6.

Example 3 illustrates how the presence of the modifier opens the door to the curing of high density polyethylene with peroxide curing agents. It is apparent from a comparison of Runs 6 and 7 that curing is effected by rather small differences in the amount of modifier. For the system of this example about 3% of the modifier appears to be optimum.

This example also illustrates the desirability of blending the modifier with a peroxide cross-linking agent to provide a stabilized product prior to the incorporation of the peroxide cross-linking agent with the polymer to be cured by chemical cross-linking.

EXAMPLE 4

The low density polyethylene composition of Example 1 was tested as in Example 1 except in relation to a different modifier. The modifier used was prepared by allowing ethyl benzene to react with paraformaldehyde in the presence of a catalyst. The resulting reaction product containing a plurality of benzylic hydrogens was stripped of unreacted ethyl benzene, leaving a viscous oil.

Run 1 of Example 4

The basic low density polyethylene composition of Example 1 was tested at 150° C. and effective curing occurred in about 13 minutes, the consistency value rising from about 200 to about 580.

Run 2 of Example 4

Run 1 was repeated when 0.92 gm. of the above-described modifier was present in the 46-gm. batch and in this run the consistency value only rose to about 310, thereby showing the effectiveness of the modifier in inhibiting curing.

EXAMPLE 5

Again using the low density polyethylene composition of Example 1, there was added to the 46-gm. test batch 0.92 gm. of the aromatic material used in making the condensation product used as the modifier in Example 1. This material is an aromatic material whose boiling range is 425° to 600° F. and contains constituents having one or more benzylic hydrogens such as dimethyl naphthalene. At 149° C. the consistency value only rose from about 180 to about 340 over a period of about 15 minutes, thereby showing that with this aromatic modifier in the amount used in relation to the dicumyl peroxide content of the composition there was a very substantial retarding effect but not as complete a retarding effect as when employing the condensation product of Example 1. The condensation product is preferred for this reason. It also is preferred in that it is a resinous material having lower volatility whereby it is retained more completely in the composition. However, this example shows that a high boiling aromatic material containing one or more benzylic hdyrogens may be used in the practice of this invention. A material such as this high boiling aromatic material while possessing some volatility at curing temperature is sufficiently non-volatile to permit incorporation in the polyethylene and to be retained during working so as to enable the peroxide to be readily incorporated and likewise enable the peroxide-containing polyethylene to be formed into bodies of desired shape without excessive premature curing.

More generally, the modifier that is used should be sufficiently low in volatility and sufficiently stable to be present in the particular blend of polymer and peroxide that is being used during the period required for forming the blend into bodies of desired shape or other processing prior to curing. Since in most instances the processing prior to curing is carried on at a temperature somewhat above the softening point of the polymer, the modifier should remain present in effective amount at least long enough for it to exercise a substantial retarding effect during processing. However, it is not essential that the modifier be present during curing. It is one of the extraordinary properties of the modifiers that are employed according to this invention that when the temperature is raised curing takes place at nearly the same rate that it takes place at that temperature in the absence of the modifier. However, it also is the case that the desired curing also can be caused to take place at the more elevated curing temperature in the absence of the modifier, so it is not important that the modifier remain blended with the polymer during the curing step unless a modifier is used which desirably may remain present as an extender or for the purpose of altering the properties of the cured polymer or for some other reason. The modifier used in each of Examples 1, 2, 3 and 4 is such that nearly all of it is retained in the cured polymer. Moreover, the modifier used in Example 5 is largely retained. However, for some purposes a more volatile modifier may desirably be employed which remains present at forming temperature sufficiently long to permit forming or other processing but which is largely dissipated at the higher temperature of curing. Modifiers of this type may be illustrated by cumene and p-tertiary butyl toluene which are included in the tabulation of Example 9. If especially high degrees of curing are desired, the use of modifiers which are at least partially eliminated at final curing temperature may be employed, especially in the case of any system wherein the presence of the modifier throughout curing may detract from ultimate strength or other desired property obtained by curing or when it is desired to complete the cure at a temperature somewhat lower than the final curing temperature which normally would be used when substantially all of the modifier is retained throughout the curing step.

EXAMPLE 6

An additional 1% of dicumyl peroxide was added to the low density polyethylene composition of Example 1 so that the composition contained 3% instead of 2% of the dicumyl peroxide. In the presence of 2% of the modifier of Example 1 some curing occurred but the curing was substantially inhibited. The modifier content was increased to 3% and the curing was further inhibited, thus showing that increased quantities of a peroxide cross-linking agent may be used with safety when using a modifier in accordance with this invention.

EXAMPLE 7

This example illustrates modification of the activity of a metallic peroxide such as lead peroxide as a curing agent for polymers of the polysulfide rubber type.

Two preliminary compositions were prepared as follows:

(a) Polysulfide sealant composition: Percent
    Polysulfide polymer in liquid form sold under the trade designation LP-2 _____ 40
    Stearic acid _____ 1
    Plasticizer in the form of a mixture (of chlorinated diphenyl and terphenyl) obtainable under the trade name Arochlor _____ 40

Clay _____ 19
(b) Standard C-5 paste:
    Lead peroxide _____ 50
    Dibutyl phthalate _____ 45
    Stearic acid _____ 5

Using the aforesaid preliminary compositions, two curable compositions were prepared as follows:

Curable composition No. 1: Parts
    Polysulfide sealant composition _____ 60
    Standard C-5 paste _____ 5
    Modifier used in Example 1 _____ 2.5
    Diisodecyl phthalate _____ 2.5
Curable composition No. 2:
    Polysulfide sealant composition _____ 60
    Standard C-5 paste _____ 5
    Diisodecyl phthalate _____ 5

In order to facilitate the introduction of the modifier in preparing curable composition No. 1, it was first dissolved in the diisodecyl phthalate. In both instances the standard C-5 paste was added last after the rest of the mixture had been prepared so that the lead peroxide catalyst with C-5 paste became mixed in each of curable compositions Nos. 1 and 2 at the same moment. It follows from the formulation of curable composition No. 1 that it contains 2.5 parts of the lead peroxide and 2.5 parts of the modifier.

Curable compositions Nos. 1 and 2 were kept in open containers at 70° F. and observations were noted as follows:

| Time after mixing (hrs.) | Curable composition No. 1 | Curable composition No. 2 |
|---|---|---|
| 5 | Pourable | Pourable but thicker than 1. |
| 7½ | do | Almost cured. |
| 8½ | Pourable, but a thin skin on surface. | Essentially cured. |
| 9½ | Still pourable and skin on surface was thicker. | Cured. |
| 18 | Cured | Do. |

From a practical standpoint, composition No. 2 could no longer be applied after standing for 5 to 6 hours. Attaining a corresponding degree of cure in the case of composition No. 1 required about 18 hours. This example illustrates how by the judicious use of a small amount of a modifier in accordance with this invention the pot life of a sealing composition of this type can be substantially extended. Other inorganic peroxide cross-linking agents also may be employed such as sodium peroxide and zinc peroxide.

EXAMPLE 8

This example illustrates the applicability of this invention when curing a polymeric material such as ethylene-propylene rubber. The composition that was tested had the following composition:

Gms.
Ethylene-propylene rubber _____ 62.5
Commercial anti-oxidant _____ 0.3
Zinc oxide _____ 3.0
Dicumyl peroxide _____ 4.2

When tested in the absence of any modifier at 135° C. an effective cure was obtained. When 4 gms. of the modifier of Example 1 was added there was slight inhibition of curing. When 10 gms. of the modifier was used, very effective inhibition of curing was obtained.

The foregoing formulation contained no clay. However, sometimes ethylene-propylene rubber is made commercially containing a large quantity of clay filler. When attempt was made to inhibit the curing of a composition of this type, the use of an amount of modifier corresponding to the aforesaid amounts used in this example did not result in a substantial inhibition of curing. This was due, it is believed, to adsorption of the modifier by the clay in such a way as to take out the modifier as a retardant for the cross-linking reaction. If the presence of clay is desired, it could be added after incorporating the modifier.

EXAMPLE 9

A series of runs was made under the conditions, and employing the substances described, in Example 1 except that 2% of each of a series of organic compounds containing a benzylic hydrogen, including the modifier of Example 1, was employed and except that for each modifier the time in minutes was recorded to reach 400 torque units at each of the temperatures 130° C., 149° C. and 204° C., the speed of rotation being 62 r.p.m. The torque units peak at 204° C. also was recorded. The results are shown in the following table:

| Modifying | Minutes to reach 400 torque units | | | Torque units at peak, 204° C. |
|---|---|---|---|---|
| | 130° C. | 149° C. | 204° C. | |
| Control | 38 | 10.5 | 1.33 | 850 |
| Modifier of Example 1 | +50 | 25 | 1.75 | 560 |
| Bardol | +50 | +50 | 1.25 | 620 |
| Low mol. wgt. polystyrene | +50 | 29 | 1.25 | 630 |
| Substituted phenol novolac | +50 | +50 | 1.75 | 520 |
| Phenol/cresol novolac | +50 | +50 | 1.60 | 440 |
| Straight phenol novolac | +50 | +50 | 1.60 | 590 |
| 3-chloropropenyl benzene | +50 | +50 | 2.75 | 490 |
| p-Tertiary butyl toluene | 43 | 12.5 | 1.50 | 700 |
| Cumene | +50 | 17 | 0.75 | 700 |

Certain of the modifiers appearing in the foregoing table are further defined as follows:

Bardol is a highly aromatic fraction from petroleum refining.
The substituted phenol novolac is a non heat-reactive oil soluble resin prepared from a substituted alkyl phenol.
The phenol/cresol novolac was prepared using technical phenol containing about 10% cresol.
The low molecular weight polystyrene had a molecular weight of about 300.

In addition to the specific novolacs appearing in the foregoing table, other resins of the phenol-formaldehyde type including resoles may be used, namely, straight phenol-formaldehyde resins, substituted phenol-formaldehyde resins and mixtures of phenol-formaldehyde and substituted phenol-formaldehyde resins which are in a sufficiently uncured state to be dispersible in the polymer and to be reactive with peroxyl radicals furnished by the peroxide with which the modifying agent is used.

Most of the modifiers of the foregoing table effectively stopped substantial curing at 130° C. and also at 149° C. The modifier of Example 1 effectively slowed down the curing rate at 149° C. in relation to the control. In the case of cumene and p-tertiary butyl toluene, there is lesser retarding effect at 130° C. and 149° C. while the peak consistency at 204° C. is higher than in the case of the other modifiers. These phenomena are due to their greater volatility with resultant loss of these modifiers from the composition. If, when using these modifiers, greater retarding effect is desired at 130° C. or 149° C., a larger amount of these modifiers may be employed initially.

At 204° C. the curing to a torque value of 400 occurred very rapidly. It is to be noted, however, that in some instances the torque value at peak was less than that for the control. However, this may be compensated for by use of a more volatile modifier, as above noted, or by use of a somewhat larger amount of the peroxide curing agent. In fact, one of the advantages of this invention is that by use of the modifier the peroxide curing agent can be so controlled as to permit the use, without excessive premature curing, of amounts of peroxide curing agents in excess of that previously considered to be feasible.

3-chloropropenyl benzene, as shown in the foregoing table, is an effective modifier for use according to this invention. Its molecular structure is such that it contains a benzylic hydrogen. However, it is believed that this compound possesses initial reactivity with free peroxyl radicals supplied by the peroxide cross-linking agent at processing temperatures which may not occur directly with the benzylic hydrogen to form a free benzylic radical. Instead, there may be a cleavage of the chlorine atom followed by steric resonance with respect to the benzylic carbon whereby free benzylic radicals become present in the system. More generally, any compound which contains a benzylic carbon and which is reactive with the peroxdie to produce a free benzylic radical at the site of the benzylic carbon may be employed in the practice of this invention.

In addition to the operable modifier tabulated in Example 9, a further experiment was carried out using instead a mixed tertiary mercaptan under the same processing conditions. The mercaptan does not contain a benzylic hydrogen nor is it susceptible to modification by reaction with free peroxyl radicals to afford a free benzylic radical. However, the mercaptan is reactive with the peroxide curing agent, but it is so highly sensitive that the presence of the mercaptan prevented any curing at all from occurring, whether at 149° C. or 204° C. In order to possess the peculiar property of retarding premature curing while permitting effective curing after processing, the compound should contain a benzylic hydrogen or should otherwise be reactive with free peroxyl radicals to afford free benzylic radicals in the presence of the peroxide cross-linking agent contained in the polymer matrix.

In chemical cross-linking using peroxide curing agents the curing temperature may range from room temperature to the maximum temperature at which the polymer may be processed without excessive thermal decomposition. For some polymers the curing temperature desirably does not exceed about 200° C. However, some polymers such as butyl rubber may be safely cured at temperatures up to about 230° C. Usually curing is effected in the temperature range from about 120° C. to about 190° C. The peroxide curing agent that is employed is, of course, one which induces substantial curing at a temperature within the effective curing range and which is adapted at a temperature below said range to be blended with the polymer and brought to the curing temperature without substantial volatilization. It may be liquid or solid at ordinary temperatures. The polymer while substantially non-volatile at the temperature at which it is cured, is one that softens at a temperature sufficiently low to permit blending of the peroxide with the polymer without excesive premature cross-linking. Moreover, the polymer after having been blended with the peroxide must remain sufficiently soft and plastic to permit shaping of articles to desired contours. After the blend has been shaped to the desired form, then a further increase in temperature to the curing temperature causes curing with attendant increase in form stability as compared with the uncured material. Since the tendency to react with occurrence of cross-linking is approximately doubled for each increase in temperature of about 6° C., the system is one wherein only a moderate increase in temperature is required in order to go from a temperature appropriate for blending and shaping to a curing temperature. Usually the organic peroxide cross-linking agent will be about 0.5% to about 10% by weight on the weight of the polymer. However, a great proportion might be employed.

The temperature at which the polymer is blended with the peroxide will vary depending upon the softening point of the polymer and the dispersibility of the peroxide in the polymer. When the modifier that is used according to this invention is present, the curing temperature actually may be above the temperature at which effective curing would occur in the absence of the peroxide, but when the modifier is not present the temperature at which blending and shaping are effected is below the temperature at which excessive premature curing would occur. When this temperature approaches the softening point of the polymer, the difficulties mentioned hereinabove are encountered.

Some of the organic peroxide cross-linking agents which are commonly used because of their favorable curing temperatures and compatability at temperatures employed ing blending and forming and because of freedom from excessive volatility at the temperatures prevailing during blending, forming and curing are di-tertiary butyl peroxide; 2,4-dichlorobenzoyl peroxide; benzoyl peroxide; t-butyl perbenzoate; di-tertiary butyl diperphthalate; 2,5-bis (t-butyl peroxy)-2,5-dimethyl hexane sold under the trade name Varox; a dialkyl peroxide sold under the trade name Perkadox 14/40; a cyclo-alkyl-ketal peroxide sold under the trade name Trigonox; 2,5-dimethyl-2,5-di-(t-butyl peroxy) hexane sold under the trade name Luperco 101–XL; and 2,5-dimethyl-2,5-di(t-butyl peroxy) hexyne-3 sold under the trade name Luperco 130–XL. A number of other known organic peroxide cross-linking agents are disclosed in Patents 2,928,801; 2,991,268; and 3,079,370.

The cross-linking reaction which occurs during curing is a well-known one which is believed to be induced by the decomposition of the organic peroxide with formation of free peroxyl radicals that are reactive directly or indirectly with abstractable hydrogens of the polymer or that add to unsaturated sites on the polymer chain to set up free radical sites in the polymer at which cross-linking occurs.

The inhibiting effect of the modifiers that are employed according to this invention may be availed of in connection with any blend of an organic peroxide cross-linking agent and a polymer substrate adapted to be cured by cross-linking induced by the action of the peroxide when the blend is heated in the presence of the peroxide curing agent. Further examples of polymer substrates in connection with which this invention may be employed when subjected to curing promoted by a peroxide cross-linking agent are natural rubber, polybutadiene rubber, styrene butadient rubber, nitrile butadient rubber, acrylates, urethanes, chlorosulfonated polyethylene, neoprene, ethylene-propylene terpolymer and polyisoprene. It is to be understood that the term cross-linking as used herein and in the claims includes cross-linking of the type which frequently is referred to as vulcanization especially in connection with natural and synthetic rubber type polymers.

The precise action of the modifier is not understood whereby it is effective to elevate the curing temperature so that curing is inhibited at what otherwise would be an effective curing temperature but is permitted to occur freely at a somewhat higher temperature. While this invention is not to be regarded as dependent upon the correctness of theoretical considerations mentioned herein, nevertheless it is believed that the reactivity of the benzylic carbon and the energetics of its reactivity with radicals derived from the peroxide cross-linking agent are such as to retard the effect of free peroxyl radicals in inducing cross-linking of the polymer substrate, while at a temperature somewhat higher a modified reaction takes place whereby curing is rapidly effected. Such action is indicated by the nature of the observed phenomena not only in the system containing the polymer substrate but also when the modifier is blended solely with the organic peroxide. When an organic peroxide cross-linking agent per se is heated to a temperature sufficiently high to induce its decomposition, the decomposition is believed to involve the formation of free peroxyl radicals. Accordingly, the retarding action of the modifier in accordance with this invention has applicability to the stabilization of organic peroxide cross-linking agents per se as well as systems wherein organic peroxide cross-linking agents are employed in combination with a polymer substrate adapted to cure by cross-linking induced by the peroxide cross-linking agent.

As has been shown in connection with the foregoing examples, the amount of the modifier in relation to the peroxide may vary quite widely depending on the particular polymer substrate with which the peroxide cross-linking agent is used and the particular modifier that is used. If an excessive amount of the modifier is employed, it may result in preventing any substantial curing whatever of the polymer substrate at a temperature below that at which excessive thermal decomposition of the polymer occurs. However, in any given system comprising a peroxide cross-linking agent, a polymer substrate adapted to be cured by cross-linking induced by the peroxide and a modifier that is used in accordance with this invention, there is a zone wherein the amount of modifier is sufficient to substantially elevate the curing temperature at which curing would occur in the absence of the modifier but is not in excess of that which permits effective curing to be accomplished at a safe temperature, namely, at a temperature below that at which excessive thermal decomposition of the blend occurs. Usually the ratio by weight of the amount of modifier in relation to the amount of organic peroxide cross-linking agent is about 0.01:1 to 5:1.

Numerous petroleum stocks contain aromatic compounds having one or more benzylic hydrogens. Many such stocks contain various alkyl benzenes such as di-, tri- and tetramethyl benzenes, methyl ethyl benzene, propyl benzene, etc. Such stocks also often contain alkyl and polyalkyl naphthalenes and alkyl and polyalkyl anthracenes.

The aromatic compounds in petroleum stocks which contain one or more benzylic hydrogen atoms may vary considerably as regards volatility. Thus the high boiling fraction of Example 5 contains a high proportion of aromatic compounds of low volatility. Lower boiling fractions will, of course, contain hydrocarbons of greater volatility. In the case of aromatic compounds which contain one or more benzylic hydrogens and which are considered undesirably volatile, such compounds may, if desired, be condensed to form condensation products that also contain one or more benzylic hydrogens. For example, as disclosed in U.S. Patents 2,494,578; 2,501,600 and 2,660,572, condensation of compounds of relatively high volatility may be accomplished by reaction with a carbonyl compound, such as formaldehyde, in the presence of a catalyst and with the formation of methylene linkages to form aromatic compounds which are of sufficiently high molecular weight to be of lower volatility or which may be substantially non-volatile even at curing temperatures and which contain one or more benzylic hydrogens. Such a condensation reaction is illustrated by Example 4. Moreover, the modifier employed in each of Examples 1–3, 6 and 8 is a product of such condensation reaction and the employment of such products constitutes preferred practice of this invention.

When employing a product of condensation reaction or in otherwise selecting an aromatic organic compound for use as a modifier in accordance with this invention it is apparent that the compound should be one that is compatible with the peroxide and with the polymer substrate in the sense of capacity to go into solution therewith or otherwise become intimately dispersed therein. Moreover, since it appears that the effect of the modifier as herein disclosed is an attribute resulting from formation and presence of free benzylic radicals and the special energetics of such radicals in relation to free peroxyl groups produced upon heating an organic peroxide to a temperature at which substantial curing normally would occur, it is apparent that the organic compound should be one that contains a benzylic carbon and that is reactive with the peroxide cross-linking agents to form a free benzylic radical at the site of the benzylic carbon.

What is claimed is:

1. A composition comprising a peroxide cross-linking agent intimately dispersed in a polymer adapted to be cured in the presence of and induced by said cross-linking agent, said polymer being selected from the group consisting of low density polyethylene, high density polyethylene, silicone rubber, ethylene-propylene rubber, ethylene-propylene terpolymer, natural rubber, styrene butadiene rubber, nitrile butadiene rubber, polybutadiene rubber, acrylates, urethanes, chlorosulfonated polyethylene, neoprene and polyisoprene; and comprising 3-chloropropenyl benzene dispersed in said polymer and present in an amount which is consistent with substantial curing of said polymer induced by said peroxide cross-linking agent and which is effective to substantially retard the rate of curing of said polymer induced by said peroxide cross-linking agent at a temperature at which substantial curing would occur in the absence of said compound.

2. In a process of curing an organic polymer by chemical cross-linking with a peroxide cross-linking agent, said polymer being selected from the group consisting of low density polyethylene, high density polyethylene, silicone rubber, ethylene-propylene rubber, ethylene-propylene terpolymer, natural rubber, styrene butadiene rubber, nitrile butadiene rubber, polybutadiene rubber, acrylates, urethanes, chlorosulfonated polyethylene, neoprene and polyisoprene, the improvement which comprises intimately blending 3-chloropropenyl benzene with said organic polymer and said organic peroxide in an amount which is consistent with substantial curing of said polymer induced by said peroxide cross-linking agent and which is effective to substantially retard the rate of curing of said polymer induced by said peroxide curing agent at a temperature at which substantial curing would occur in the absence of said compound.

References Cited

UNITED STATES PATENTS

| | | | |
|---|---|---|---|
| 2,284,479 | 5/1942 | Rust et al. | 252—426 |
| 2,618,538 | 11/1952 | Jones et al. | |
| 2,882,258 | 4/1959 | Briggs | 260—892 |
| 2,928,801 | 3/1960 | Safford et al. | |
| 3,092,587 | 6/1963 | Ester et al. | |
| 3,157,628 | 11/1964 | Hill et al. | 260—848 |
| 3,211,804 | 10/1965 | Baum et al. | 260—848 |
| 3,256,368 | 6/1966 | Soldatos et al. | 260—848 |
| 3,335,124 | 8/1967 | Larsen. | |

SAMUEL H. BLECH, *Primary Examiner.*

JOHN C. BLEUTGE, *Assistant Examiner.*

U.S. Cl. X.R.

252—426; 260—3, 4, 31.8, 37, 41, 77.5, 79.1, 79.3, 80.78, 260—83.3, 85.1, 88.2, 91.7, 94.7, 94.9, 610, 826, 827, 838, 260—848, 852, 859, 878, 879, 880, 881, 884, 885, 890, 260—892, 897, 901